United States Patent
Schwarz et al.

(10) Patent No.: US 8,061,306 B2
(45) Date of Patent: Nov. 22, 2011

(54) RECOVERY COLLAR FOR PETS

(76) Inventors: Alexandra Ines Schwarz, Peine Rosenthal (DE); Jochen Schwarz, Peine Rosenthal (DE)

( * ) Notice: Subject to any disclaimer, the term of this patent is extended or adjusted under 35 U.S.C. 154(b) by 489 days.

(21) Appl. No.: 11/943,829

(22) Filed: Nov. 21, 2007

(65) Prior Publication Data
US 2008/0134990 A1   Jun. 12, 2008

(30) Foreign Application Priority Data
Dec. 12, 2006   (DE) .................. 20 2006 018 951 U

(51) Int. Cl.
*A01K 15/04*   (2006.01)
(52) U.S. Cl. ........................................................ 119/815
(58) Field of Classification Search ............... 119/815, 119/821, 856, 729, 850, 855, 857, 814; 602/18
See application file for complete search history.

(56) References Cited

U.S. PATENT DOCUMENTS

| | | | | |
|---|---|---|---|---|
| 3,013,530 A * | 12/1961 | Zeman | ........................ | 119/815 |
| 3,942,306 A * | 3/1976 | Kulka | ............... | 54/80.2 |
| 4,200,057 A * | 4/1980 | Agar | ............... | 424/9.8 |
| 5,012,764 A * | 5/1991 | Fick et al. | ....................... | 119/821 |
| 5,133,295 A * | 7/1992 | Lippincott | ..................... | 119/821 |
| 5,697,328 A * | 12/1997 | Hunter | ............ | 119/714 |
| 6,044,802 A * | 4/2000 | Schmid et al. | ................ | 119/856 |
| 6,227,148 B1 * | 5/2001 | Wexler | ............ | 119/837 |
| 6,659,046 B2 * | 12/2003 | Schmid et al. | ................ | 119/815 |
| 6,925,966 B1 * | 8/2005 | Wexler | ............ | 119/850 |
| 7,523,720 B1 * | 4/2009 | Lecy et al. | ..................... | 119/832 |
| 2003/0150401 A1 * | 8/2003 | Schmid et al. | ................ | 119/815 |
| 2004/0031448 A1 * | 2/2004 | Trepanier | ..................... | 119/850 |
| 2007/0079767 A1 * | 4/2007 | Albers | ............ | 119/815 |

FOREIGN PATENT DOCUMENTS
DE           20203353 U1     9/2002
* cited by examiner

*Primary Examiner* — Rob Swiatek
*Assistant Examiner* — Kristen Hayes
(74) *Attorney, Agent, or Firm* — Vidas, Arrett & Steinkraus

(57) ABSTRACT

Recovery collar for pets comprising a disk-shaped flexible base body which comprises an opening, characterised in that the base body in the region of the opening is connected to a resilient soft sleeve, which encloses a portion of the neck of the pet.

16 Claims, 2 Drawing Sheets

(Known prior art)

(Known prior art)

RECOVERY COLLAR FOR PETS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Animals follow their instinct to clean wounds on their bodies by licking with their tongues. In a similar manner, animals instinctively want to scratch their head with their extremities (paws), when an injury or an itch occurs in the head region. This licking of wounds or scratching may be effectively prevented by a recovery collar which is used, in particular, after veterinary operations.

A recovery collar known from the prior art is shown in FIG. 2. It consists substantially of a rigid, tubular object 4 which is frequently made from plastics and is placed around the neck of the animal. The tubular object 4 extends in this case from a plane 3 in the transition region between the head 2 and the neck of the animal as far as a plane 5 in the transition region between the neck and the body of the animal. As a result, the position of the head 2 is fixed and the animal is prevented from being able to move the neck in the direction of the body. Said known recovery collar thus protects wounds on the body from being licked, but not an injury in the head region from being scratched. The natural freedom of movement of the animal is considerably restricted by said known recovery collar. Conventional animal activities such as lowering or turning the head to sense smells from the surrounding area (for example from the ground) may, therefore, only be carried out in a very restricted manner. The animal may no longer be able to detect its environment in a manner which is conventional for animals. Turning the head for sleeping is also only possible in a very restricted manner. Frequently, the animal constantly attempts to free itself from the recovery collar.

A further recovery collar known from the prior art is sketched in FIG. 3, Said recovery collar consists of a hard plastics cone 8. The end of the hard plastics cone 8 with a smaller diameter is fastened to a collar 7 on the neck of the animal. The hard plastics cone 8 widens towards the tip of the head of the animal, so that the head of the animal is located in the hard plastics cone. A drawback with this known recovery collar is that the natural orientation capacity of the animal is considerably reduced. Most animals orientate themselves when moving in their surroundings by the sensory hairs on the nose and by visual detection of their surroundings, for example a footpath. The detection of visible events is carried out by turning the head, the viewing angle being oriented to the front relative to the head. These types of orientation are, however, prevented with the known recovery collar as said recovery collar protrudes laterally substantially beyond the head of the animal. As a result of this artificial widening, the animal is able to use its natural orientation, but easily strikes against lateral obstacles with the hard plastics cone, is able to damage said obstacles or become hooked with the hard plastics cone on objects in the surrounding area, so that sometimes it is not able to free itself on its own. The freedom of movement of the animal is also restricted, which leads to the aforementioned drawbacks. In particular, only restricted food intake is possible, as the front overhang of the hard plastics cone prevents the animal from being able to reach with its nose into a feeding bowl.

A further recovery collar is known from the utility model DE 202 03 353 U1, the entire contents of which is incorporated herein by reference. Said recovery collar consists of a disk-shaped round body comprising an opening through which the neck of the animal is guided. The base body consists of a flexible material and is placed between the head and the body of the animal, when an attempt is made at licking. As a result of said known recovery collar, the freedom of movement and orientability of the animal is substantially less restricted than by the aforementioned recovery collar. A drawback with said recovery collar is that the diameter of the opening has to be adapted to the diameter of the neck relatively accurately, so that the recovery collar rests with a precision fit on the neck and is not able to be removed by the animal. This has the result that an individual recovery collar has to be made substantially for each neck diameter.

Proceeding therefrom, it is the object of the invention to provide an improved recovery collar which has a high degree of wearing comfort and may be universally used.

BRIEF SUMMARY OF THE INVENTION

The recovery collar for pets has a disk-shaped flexible base body which comprises an opening, the base body in the region of the opening being connected to a resilient soft sleeve, which encloses a portion of the neck of the pet. The term "recovery collar" is, therefore, in the conventional sense used both for a protective device for protecting from licking injuries and also for a protective device which primarily is intended to protect from scratching wounds. The disk-shaped, flexible base body in an undeformed state has substantially the shape of a disk, but is sufficiently flexible that it is easily deformable between the body and the head of an animal, for example when turning the head, and is able to be adapted to a certain extent to the body shape of the animal. The resilient, soft sleeve serves for fixing the base body to the neck of the animal. As a result of the resilience, the sleeve is able to be adapted to different neck diameters and head shapes. As the sleeve is soft, it provides a particularly high degree of wearing comfort. The portion of the neck of the pet enclosed by the sleeve is less stressed by the recovery collar than with the variant known in the prior art, so that the animals have a reduced need to remove the recovery collar.

In a preferred embodiment of the invention, the base body and the opening therein are circular. Preferably, the external diameter of the base body is dimensioned such that, when turning its head, the pet is not able to reach with its nose over the outer edge of the base body. The recovery collar consequently offers effective protection from licking in all directions, without unnecessarily restricting the freedom of movement and orientation of the animal.

According to a further preferred embodiment of the invention, the diameter of the opening is dimensioned such that it is slightly larger than the diameter of the neck of the pet. It is thereby ensured that, when the recovery collar is applied, the base body is located at a distance from the neck of the pet, the neck thus substantially only being in contact with the soft sleeve. As a result, the wearing comfort is optimised.

In a further preferred embodiment of the invention, the base body has a thickness of 1.5 cm to 5 cm. Preferably, the base body is approximately 3 cm thick. Tests have shown that this relatively high material thickness leads to advantageous flexibility properties of the base body; the base body remains easily deformable and at the same time reliably adopts its disk-shaped form.

In a further preferred embodiment of the invention, the base body consists of foamed material. As a result, the base body is, per se, relatively soft. It may, therefore, perform the function of a pillow at the same time.

Preferably the foamed material has a high degree of stability. Such foamed material with an increased degree of stability is, for example, known from the field of furniture upholstery. The relatively high degree of stability has the result that the disk shape of the base body remains stable and the recovery collar protrudes uniformly from the neck of the animal in all directions.

In a preferred embodiment of the invention, the base body is provided with a fabric cover. The fabric cover protects the surface of the base body from soiling and gives the recovery collar an attractive external appearance which promotes gripping.

According to a further preferred embodiment of the invention, the fabric cover is water repellent and/or washable. As a result, the recovery collar is particularly easy to clean.

In a further preferred embodiment of the invention, the fabric cover comprises a polyester fabric. Advantageously, canvas material may be used, for example. This material is particularly easy to clean and prevents the penetration of water into the base body. At the same time, the particularly robust fabric cover protects the base body from attempts at damage by the animal as well as the porous base body material from hooking onto objects from the surrounding area.

According to a further preferred embodiment of the invention, the portion of the neck enclosed by the sleeve is at least 2 cm long. As a result, the wearing comfort is further increased. Additionally, a relatively wider enclosed neck portion leads to an improved fixing of the recovery collar in which a pivoting of the recovery collar relative to the plane located perpendicular to the longitudinal axis of the neck is prevented.

In a further preferred embodiment of the invention, the sleeve is tubular. The tubular shape promotes a positioning of the sleeve in a relatively wide neck portion.

According to a further preferred embodiment of the invention, one end of the sleeve is fastened to the base body. As a result, the recovery collar may be particularly easily positioned. Preferably, the base body is located, therefore, in a plane of the neck located in the vicinity of the head and the tubular sleeve extends in the direction of the body. The recovery collar is, therefore, located particularly close to the head of the animal and may particularly effectively prevent licking of wounds.

In a further preferred embodiment of the invention, the diameter of the sleeve tapers from the end fastened to the base body in the direction of the free end. The free end may, however, be widened so that positioning of the recovery collar is possible. At the same time, a particularly efficient adaptation of the sleeve to different neck diameters is produced.

According to a further preferred embodiment of the invention, the sleeve is made from fabric. By selecting a suitable fabric, advantageous resilient properties as well as a high degree of wearing comfort are achieved.

In a further preferred embodiment of the invention, the sleeve is made from a plurality of layers of fabric. As a result, the stability and resilience of the sleeve may be improved.

In a further preferred embodiment of the invention, the fabric of the sleeve is a knitted fabric. A knitted fabric is, per se, very resilient and provides, therefore, a high degree of wearing comfort. The knitted fabric fits the neck tightly in a similar manner to the collar of a polo neck pullover.

Preferably, the fabric of the sleeve consists of synthetic fibres. As a result, it is achieved that the fabric is relatively durable and easy to clean.

According to a further preferred embodiment of the invention, at least one loop through which a collar may be passed is arranged in the region of the opening of the base body. Preferably, for example, three loops are used. If necessary, the base body may be fastened by means of a collar more securely to the neck of the animal.

BRIEF DESCRIPTION OF THE SEVERAL VIEWS OF THE INVENTION

The invention is explained in more detail hereinafter with reference to an embodiment shown in one figure, in which.

DETAILED DESCRIPTION OF THE INVENTION

Figure 1:
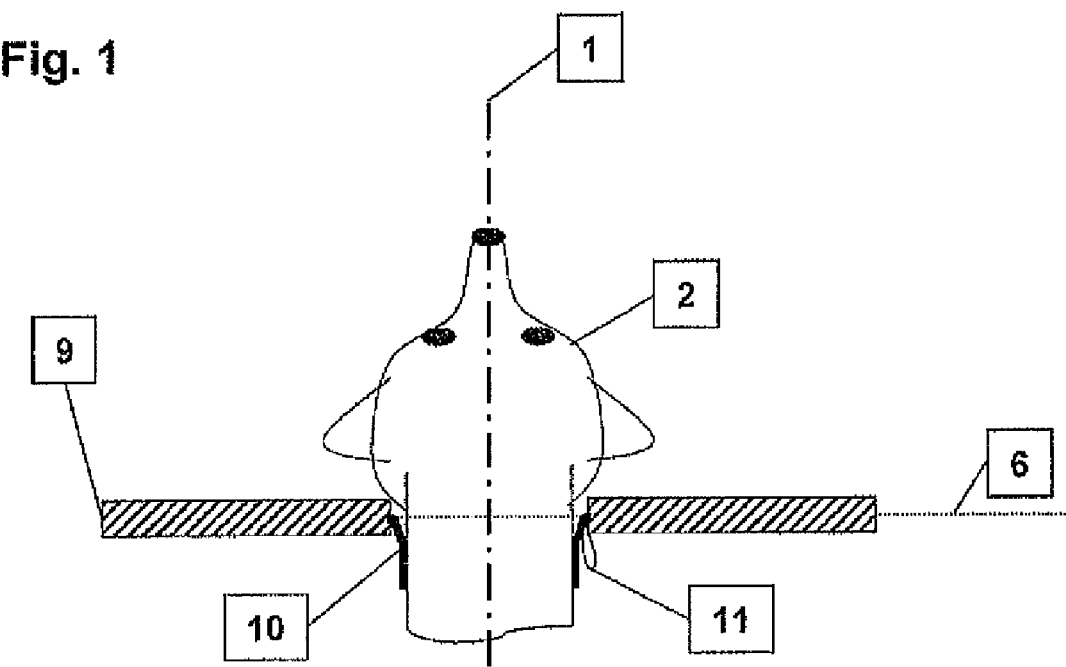
FIG. 1 shows a schematic view of a recovery collar according to the invention positioned on the neck of a pet.
Figure 2:
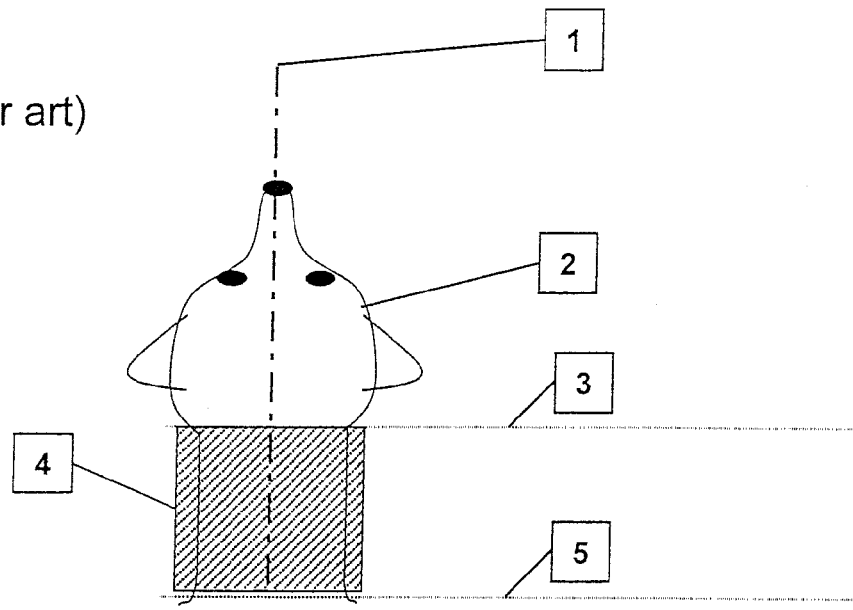
FIG. 2 shows a recovery collar according to the prior art.
Figure 3:
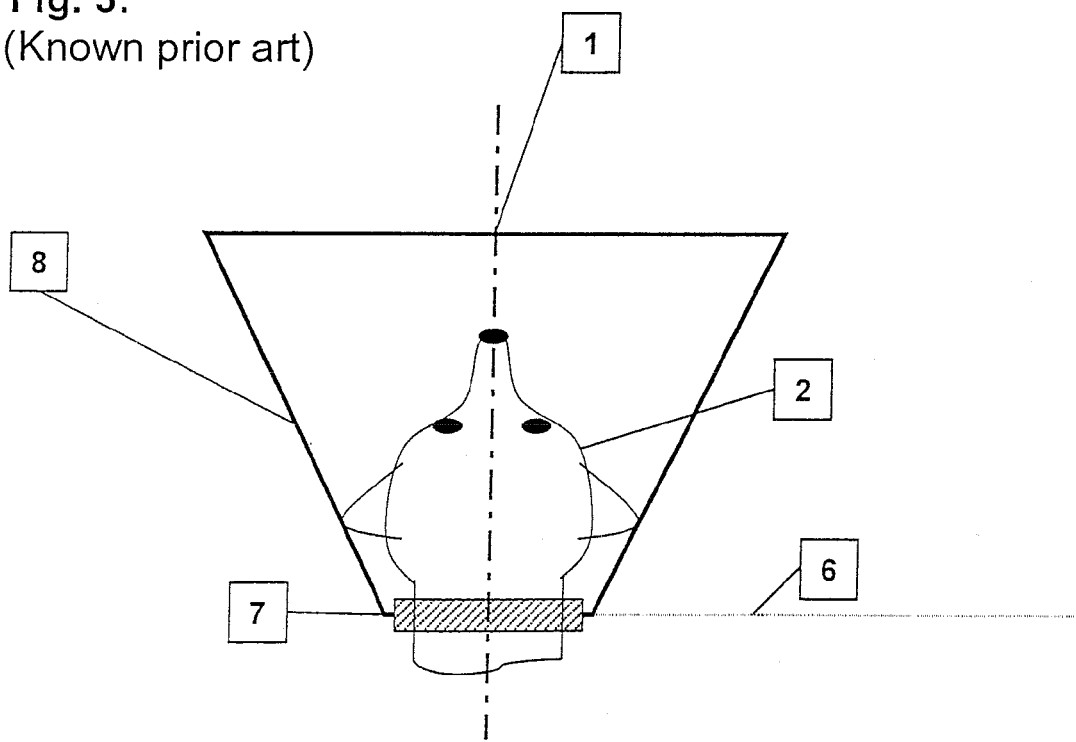
FIG. 3 shows a further recovery collar according to the prior art.

While this invention may be embodied in many different forms, there are described in detail herein a specific preferred embodiment of the invention. This description is an exemplification of the principles of the invention and is not intended to limit the invention to the particular embodiment illustrated FIG. 1 shows the head 2 of a pet. The longitudinal axis of the neck is denoted by 1. The recovery collar according to the invention has a resilient base body 9, which is arranged in a plane 6 perpendicular to the longitudinal axis 1 of the neck and in a transition region between the neck and head 2 of the animal. On the neck of the animal the flexible base body 9 is fastened to a resilient sleeve 10. The sleeve 10 is tubular, one end of the sleeve being fastened to the flexible base body 9 at the opening extending around the neck of the animal. The resilient sleeve 10 extends from the plane 6 in the vicinity of the head of the animal along the neck in the direction towards the body, not shown, of the animal. In this case, the soft resilient sleeve 10 is located in a portion on the neck of the animal which is a few centimeters long.

The sleeve 10 consists of a synthetic fibre knitted textile fabric and is connected fixedly to the base body of the recovery collar. The sleeve tapers in the direction of the free end, but may be widened so that the positioning of the recovery collar may be carried out without further operations. The recovery collar may, therefore, be used for animals with different neck diameters and head shapes.

According to a further preferred embodiment of the invention, at least one loop 11 through which a collar may be passed is arranged in the region of the opening of the base body (see FIG. 1). Preferably, for example, three loops are used. If necessary, the base body may be fastened by means of a collar more securely to the neck of the animal.

The base body 9 consists of a rigid foamed material of approximately 3 cm thickness. The external diameter of the circular base body 9 is approximately 40 cm. The opening in the base body 9 is also circular and has a diameter of approxi mately 14 cm. The base body 9 is covered by canvas material made of polyester.

As a result of the disk shape of the base body 9 and the arrangement thereof substantially perpendicular to the longitudinal axis 1 of the neck, the animal and its need for licking is substantially restricted along the transverse axis. In this case, the mobility of the head and the neck remains substantially maintained.

By the use of the recovery collar according to the invention, the orientability of the animal is ensured by means of the sense of touch and the visual detection organs on the head. The full mobility of the neck of the animal is also provided. When the recovery collar comes into contact with an object in the surrounding area by a movement of the animal, the recovery collar yields in its shape and the animal is able to pass the object easily. At the same time, damage to objects is avoided.

When the animal, however, turns round, in order for example to lick a wound on its own body, the base body 9 of the recovery collar is located between the head 2 and the body of the animal and prevents the animal from reaching the wound with its nose and thus with its tongue.

At the same time, the positioned recovery collar prevents the animal from reaching injuries on the head with its extremities. The base body is positioned between the foot (paw) of the animal and the head and forces the leg (the paw) to carry out the scratching movement past the head.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:
1. Recovery collar for pets comprising a disk-shaped flexible base body (9) which comprises an opening, wherein the base body (9) in the region of the opening is connected to a tubular sleeve (10), and which is adapted so it may enclose a portion of the neck of the pet, the sleeve (10) is resilient and soft and is made from a fabric such that the sleeve (10) as a result of its resilience is adapted to conform to different neck diameters and to contact the neck of the pet in a portion which is a few centimeters long.

2. Recovery collar according to claim 1, characterised in that the base body (9) and the opening therein are circular.

3. Recovery collar according to claim 1, characterised in that an external diameter of the base body (9) is dimensioned such that, when turning its head, the pet is not able to reach with its nose over the outer edge of the base body (9).

4. Recovery collar according to claim 1, characterised in that the diameter of the opening is dimensioned such that it is slightly larger than the diameter of the neck of the pet.

5. Recovery collar according to claim 1, characterised in that the base body (9) has a thickness of 1.5 cm to 5 cm.

6. Recovery collar according to claim 1, characterised in that the base body (9) consists of foamed material, preferably with a high degree of stability.

7. Recovery collar according to claim 1, characterised in that the base body is provided with a fabric cover, which is preferably water repellent and/or washable.

8. Recovery collar according to claim 7, characterised in that the fabric cover comprises a polyester fabric.

9. Recovery collar according to claim 1, characterised in that the portion of the neck which may be enclosed by the sleeve (10) is at least 2 cm long.

10. Recovery collar according to claim 1, characterised in that the one end of the sleeve (10) is fastened to the base body (9).

11. Recovery collar according to claim 10, characterised in that the diameter of the sleeve (10) tapers from the end fastened to the base body (9) in the direction of a free end.

12. Recovery collar according to claim 11, characterised in that the fabric is a knitted fabric.

13. Recovery collar according to claim 1, characterised in that the sleeve (10) is made from one or more fabric layers.

14. Recovery collar according to claim 13, characterised in that the fabric consists of synthetic fibres.

15. Recovery collar according to claim 1, characterised in that at least one loop (11) through which a collar may be passed is arranged in the region of the opening of the base body (9).

16. Recovery collar for pets comprising:
a disk-shaped flexible base body (9) which comprises an opening, and
a tubular sleeve (10) which encloses a portion of the neck of the pet,
characterized in that the base body (9) in the region of the opening is connected to the sleeve (10), the sleeve (10) is resilient and soft and is made from a fabric such that the sleeve (10) is able to be adapted to different neck diameters and is adapted to be located in a portion on the neck of the animal which is a few centimeters long.

* * * * *